Sept. 12, 1944.   B. P. POND   2,358,186
PNEUMATIC MOTOR
Filed Dec. 8, 1941
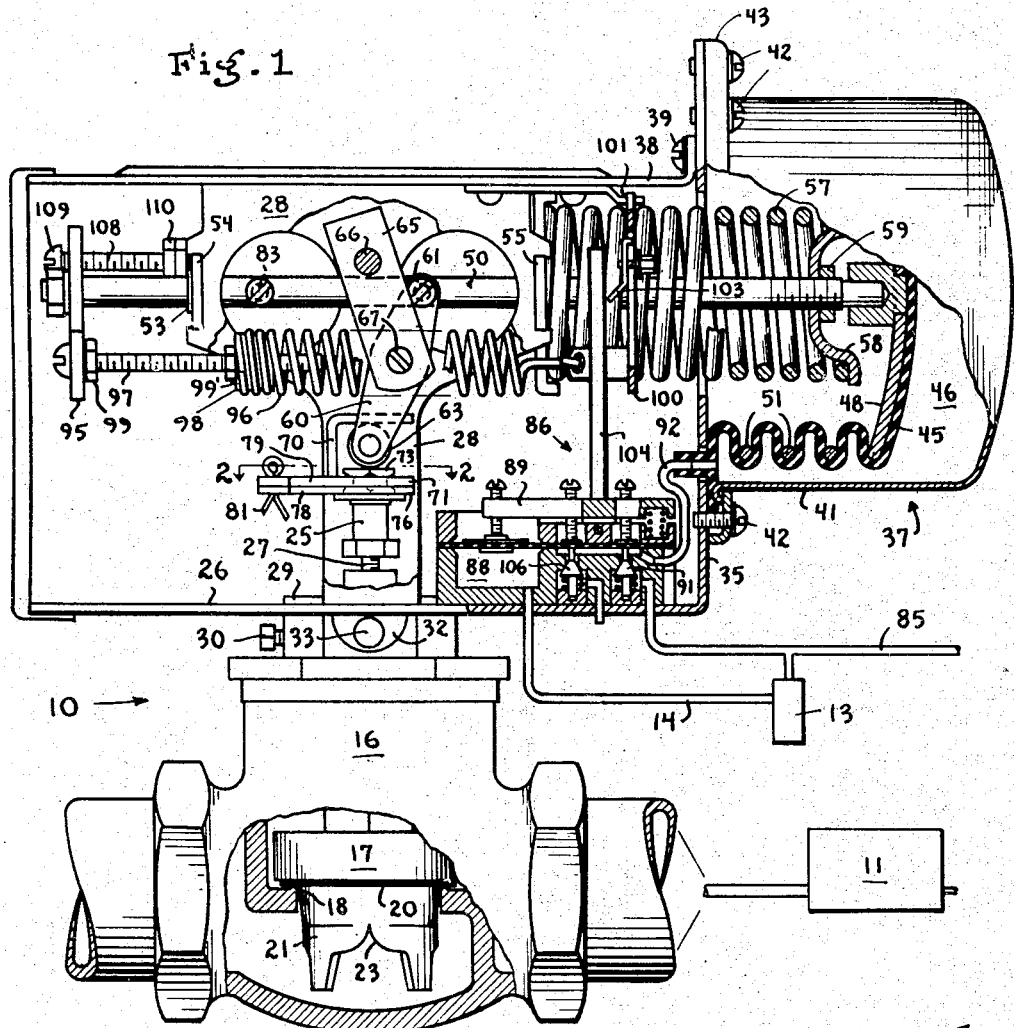
Fig. 1
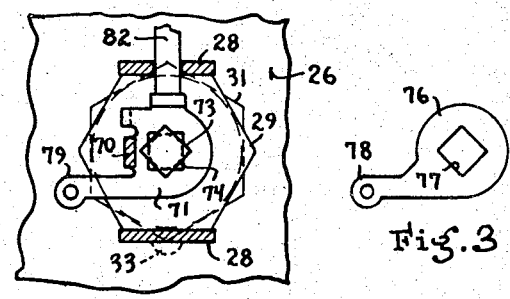
Fig. 2
Fig. 3
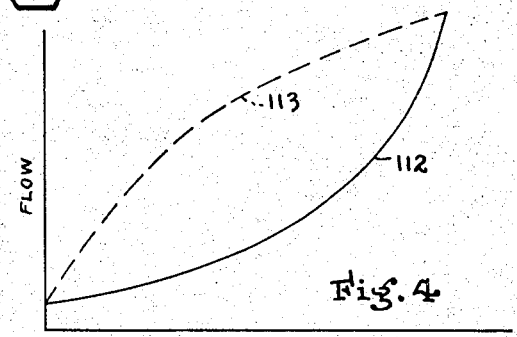
Fig. 4
BRANCH LINE PRESSURE
INVENTOR.
Bertram P. Pond
BY George H. Fisher
Attorney Patented Sept. 12, 1944

2,358,186

UNITED STATES PATENT OFFICE 2,358,186

PNEUMATIC MOTOR

Bertram P. Pond, River Forest, Ill., assignor to Minneapolis-Honeywell Regulator Company, Minneapolis, Minn., a corporation of Delaware Application December 8, 1941, Serial No. 422,043

7 Claims. (Cl. 121—41)

The present invention relates to pneumatic motors generally but in its more restricted aspects relates to a pneumatic motor particularly adapted to operate a valve and modulate the flow therethrough in response to changes in control pressure applied to the motor as determined by a thermostat or other condition responsive device.

One of the peculiarities of valves which has long been the subject of consideration is the exponential relation which exists between the rate of fluid flow through the valve and valve opening. A given valve opening permits a flow which is much more than half the flow permitted by an opening of twice that amount. Since the most convenient and common valve structure comprises a disk which is moved vertically with respect to a valve seat it follows that small movements of the valve disk at nearly closed positions cause a much greater change in the rate of flow than similar movements would cause at nearly wide open positions.

One of the expedients used to correct this condition, in part, is to employ a characterized skirt below the valve disk to limit the flow materially when the disk is in nearly closed positions. A characterized valve skirt is unable to correct the above mentioned condition entirely, however, due to the limitations of accuracy in a valve manufactured for wide sale and further because a resilient valve disk must be used to insure a tight shut-off in closed position. As the resilient disk wears, the closed position of the valve skirt will occur at slightly different positions, destroying the desired flow characteristics. Hence, it is also desirable to provide a characterized valve disk movement, i. e. relatively smaller movements of the valve disk nearer the closed than the open end of its stroke for equal changes in control pressure, in the case of a pneumatically actuated valve.

In the present invention the combination of a characterized valve disk skirt and a characterized valve movement in a pneumatically operated valve serve to give a flow characteristic in which a change in the control pressure applied to the pneumatic motor operating the valve will produce less change in flow when the valve is positioned near its seat than the same change control pressure will produce when the valve is farther open. If, then, the valve is under the control of the thermostat of a heating system and the control pressure varies in direct proportion to changes in temperature within the differential of the thermostat, a greater temperature change at the thermostat will be necessary to produce a given change in flow at small demands for heat than at larger demands. Since the normal or average demand for heat of a heating system is considerably less than half its total or design capacity, it follows that the valve will be positioned for relatively small flow during the greater part of the time that heat is required. The ideal flow characteristic and the one with which the smallest operating differential of the thermostat may be employed is one in which a given temperature change will cause equal percentage changes in flow anywhere within that differential. If the rate of flow through the valve is very critical to changes in control pressure at low rates of flow the system will have a tendency to hunt which means that the valve will no longer provide true modulating control. The remedy for this condition is to widen the differential of the thermostat, but the result will be wide variations in temperature of the system on large changes in load. The valve disclosed herewith enables true modulating flow to be obtained within a narrow control differential.

The capacity of a pneumatic motor to accurately position a valve also depends on the pressure of the fluid under control. When a valve of the disk type is in closed position, the full pressure of the fluid tends to open the valve. By providing a linkage to give the motor a mechanical advantage on the valve disk at closed position a relatively smaller motor is capable of controlling accurately relatively greater fluid pressures.

One object of the invention is to provide a pneumatic motor having a non-linear relationship between the fluid pressure applied to it and the movement of the power take-off member.

A further object is to provide a pneumatic motor in which movements of the expansible chamber bears a non-linear relationship to the movements of the power take-off member.

Another object is to provide a pneumatically actuated valve in which changes in flow for a certain change in control pressure are relatively less at nearly closed positions than in valves heretofore known to the art.

Another object is to provide a pneumatic valve motor with a linkage between the expansible motor chamber and the valve stem producing a non-linear relationship between the relative movements thereof and equipped with what is known in the art as a positive positioner operated in response to the positions assumed by the expansible chamber and also in response to control pressure.

Another object of the invention is to provide a valve which can be changed from "direct" to "reverse" acting by a change in the linkage connecting the motor and the valve stem.

An additional object is to provide a pneumatic motor employing novel means to adjust the variation in control pressure necessary to move the motor through a predetermined stroke.

Another object is to provide a valve operating motor and linkage in which the valve stem is positioned by a roller thereby eliminating side thrust on the stem and consequent friction.

Another object of the invention is to provide a convenient means for operatively connecting the valve stem to the operating mechanism so that the mechanism can move the valve toward both open and closed positions.

A further object is to provide means for releasably connecting a valve stem positioning member to the valve stem in the above mentioned valve.

A still further object is to provide a pneumatically actuated valve motor which is carried in a frame and equipped with a linkage to give a characterized valve movement and in which novel means are employed for attaching the valve body to the motor frame.

Further objects will be apparent from the following detailed specification taken together with the drawing in which:

Figure 1 is a side view showing a valve and valve motor incorporating the various features of the invention, parts being shown in section for the sake of clarity, Figure 2 shows a sectional plan view of the novel means by which the motor mechanism is connected to the valve stem, and of the means by which the valve body is fixed to the motor frame, the section being taken on line 2—2 of Fig. 1, Figure 3 shows a portion of the means shown in Figure 2, and Figure 4 is a diagram showing "fluid" flow through the valve as plotted against the control pressure applied to the pneumatic motor operating the valve.

In Figure 1 of the drawing, a valve 10 is shown in control of the flow of steam to a radiator 11 of a heating system. The temperature of the system resulting from admission of steam to the radiator 11 affects a modulating pneumatic thermostat 13 which, in turn, controls the valve 10 through a branch line 14. Thermostat 13 is shown diagrammatically only, as thermostats of this type are well known in the art. For a more detailed disclosure see for example the thermostat disclosed in the application of Frederick D. Joesting, Ser. No. 350,003 filed August 2, 1940, now Patent No. 2,326,226.

The valve, generally indicated at 10, incorporates an expansible chamber which positions the valve through a linkage which provides relatively smaller valve movements in relation to movements of the expansible chamber as the valve moves toward closed position and incorporates a positive positioner operated by the position of the chamber and branch line pressure to control the admission of pressure fluid to the chamber.

The valve 10 includes a valve body 16 of the conventional globe type in which a valve disk holder 17 moves into and out of engagement with a seat 18. The valve disk holder 17 is provided with a resilient lower surface or valve disc 20 of any suitable material. The valve disk assembly is also provided with a downwardly extending skirt 21 which is tapered slightly in its upper portion so that as the disk 20 is raised, the opening between the skirt 21 and the valve port becomes increasingly greater. The lower portion of the skirt 21 is suitably shaped or "characterized" at 23 so that as the valve disk is moved to wider open positions of the valve the valve opening is increased much more rapidly than at the smaller openings. This valve disk and skirt arrangement is of more or less conventional type and is employed to counteract the normal exponential relation between valve position and flow therethrough. The valve disk holder 17 is positioned by means of a valve stem 25 which extends upwardly through a valve motor frame 26. The valve stem 25 is provided with a screw threaded adjustment portion 27 by means of which its effective length may be adjusted to the value desired.

The valve stem 25 extends between a pair of upwardly extending members 28 which are secured to both the frame 26 and a hexagonal nut 29. See also Figure 2. The nut 29 has an interior opening suitably shaped to receive an upper portion of the valve body 16 and serves as the mechanical connection between the frame 26 and the valve body 16. The nut 29 is secured to a cylindrical portion (not shown) of the valve body 16 by means of set screws one of which is shown at 30. The nut 29 has a circular groove cut in its upper end of a width equal to the thickness of the frame member 26 while the frame 26 is provided with a hexagonal opening 31 conforming to the shape of the nut 29. The relationship between the nut 29 and the hexagonal opening 31 in the frame 26 is best seen in Fig. 2. In assembling the nut 29 in the frame 26, the nut 29 is passed through the opening 31 to a point at which the frame 26 is opposite the circular groove in the nut 29. Then the nut 29 is rotated 30° with respect to the frame 26, thereby securely locking the two together. The frame 26 is further provided with openings to receive the lower extremities 32 of the upright members 28 when the nut 29 is interlocked as described above in the frame 26. Relative rotation between the nut 29 and the frame 26 is thereby prevented and relative vertical movement between the members 28 in the frame 26 is prevented by securing the lower extremities 32 in the members 28 to the nut 29 by means of drive screws 33. It will be seen that by this means the three members above referred to are securely fixed in relation to one another in a very simple and efficient manner.

The frame 26 is provided with a vertically extending portion 35 to which the motor unit 37 of the valve motor is affixed. The vertical portion 35 of the frame is connected to the upright members 28 by means of the upper frame member 38. The members 35 and 38 are fixed together by means of screws 39 while the upright members 28 and the frame member 38 are secured together by any suitable means not shown.

The motor unit 37 includes a metallic cup 41 which is secured to the frame member 35 by means of screws 42 and the ring shaped member 43. A flexible diaphragm 45 is contained within the cup 41 and is sealed with respect thereto by the ring shaped member 43 which serves to clamp the diaphragm 45 between the cup 41 and the frame member 35. An "expansible" chamber 46 is thereby formed between the cup 41 and the diaphragm 45. The diaphragm 45 is formed of any suitable flexible material but in the present instance is preferably made of Neoprene. In order to support the diaphragm 45 a disk 48 is placed beneath the head of diaphragm 45 and serves to transmit the force due to pressure within the chamber 46 to a rod 50. The convolutions of the diaphragm 45 are suitably supported by means of metallic rings 51.

The rod 50 passes through a pair of bearings 53, one of which is carried by a plate 54, which is carried in turn between the left hand extremities of the upright members 28. The other bearing, which is not visible in Fig. 1, is carried by a plate 55 which is carried in turn by the right hand extremities of the upright members 28. The plate 55 also serves as an abutment for a compression spring 57, the other abutment for the spring 57 being a cup shaped member 58 which is adjustably secured to the rod 50 by means of a nut 59. It will be seen therefore that as the volume of the expansible chamber 46 increases, the spring 57 will be compressed and the rod 50 will be moved to the left with respect to the stationary portions of the motor.

The rod 50 and the valve stem 25 are connected together by means of a link 60 which is pivoted in the rod 50 by means of a pin 61. A roller 63 which abuts the upper end of the valve stem 25 is pivoted in the lower end of the link 60. The link 60 is guided by means of a link 65 which is pivoted in the upright members 28 on the pin 66. The lower end of the link 65 is pivoted in the link 60 by means of the pin 67. The pin 66 is located in the upright members 28 at a point directly above the center of the valve stem 25. Links 60 and 65 are bifurcated and symmetrical about the rod 50 and the roller 63. The links 60 and 65 constitute what might be termed a modified "Scott Russell" linkage, in which the roller 63 follows approximately a vertical path. In the true "Scott Russell" linkage the pin 66 would be located so that its axis was in the same plane as the axis of the rod 50 but it is possible with the present construction in which the pin 66 is above the rod 50 to provide a more rugged structure and one in which very little transverse movement of the roller 63 with respect to the valve stem 25 is encountered. The object of this linkage is to transform horizontal movements of the rod 50 into vertical movements at the valve stem 25. A further feature of the linkage is that as the valve stem 25 is moved downwardly toward closed positions of disk 20, movements of the expansible chamber 46 result in increasingly smaller movements of the valve disk. As pointed out above, desirable flow characteristics are obtained in this manner. While the link 60 could be pivoted directly in the valve stem and provide approximately the same relative movements of the rod 50 and the valve stem 25 with the link 65 omitted, considerable side thrust on the rod 50 and the valve stem 25 would result, and, besides requiring much heavier parts, the accuracy of valve positioning would suffer.

As previously mentioned the effective length of the valve stem 25 may be adjusted by means of the screw threaded portion 27. In this way the mechanism may be adjusted so that the chamber 46 has any desired leverage on the valve stem when the valve disk 20 is in closed position. This adjustment will also have an effect on the flow characteristics of the valve in its various positions.

Although pressure under the valve disk holder 17 and the disk 20 will normally keep the valve stem 25 pressed against the roller 63, it is desirable to provide means for positively lifting the disk holder 17, disk 20 and skirt 21. This is accomplished by means of the clip member 70 which is secured to the valve stem 25 and which extends over the roller 63. The clip member 70 includes a lower portion 71, as seen also in Figure 2, and which is releasably secured to the valve stem 25. The upper extremity 73 of the valve stem 25 is of square configuration but is provided with a circular groove midway of this square portion. The portion 71 of clip member 70 is provided with a square opening 74 conforming to the shape of the upper extremity 73 of the valve stem 25. To secure these members together, the clip member 70 is placed over the valve stem to a point where the opening 74 of the clip member is adjacent the circular groove in the square portion 73. The two members are then given a relative rotation of 45° leaving the parts locked as shown in Figure 2. A wrench member 76 shown in Figures 1 and 3 lies below the clip member 70 on the valve stem 25 and is provided with an opening 77 which engages the lower portion of the square portion 73 of the valve stem 25. The wrench member 76 is provided with an extension 78 which is secured to a corresponding extension 79 on the clip member 70. The extension 78 of the wrench member 76 together with the extension 79 of the clip member 70 serve as means to relatively rotate the valve stem 25 and the clip member 70 into locking position. When they are in this position a cotter pin 81 is inserted through the extensions 78 and 79, thereby securing the clip member 70 and the valve stem 25 in locked position. The clip member 70 is so formed that there is a very slight clearance between it and the roller 63 under normal conditions so that the roller 63 is free to rotate. A valve position indicator 82 shown in Fig. 2 is secured to the clip member 70 and extends through a slot in one of the upright members 28. It extends outside a motor cover which is not shown here. The indicator 82 also prevents rotation of the valve stem 25 and the member 70.

By removing the pin 61 which pivots the link 60 to the rod 50 from the position shown and reinserting it in a hole also in the rod 50, in which a stop screw 83 is located, thereby pivoting the link 60 beyond the valve stem, it will be seen that expansion of the chamber 46 and consequent movement of the rod 50 toward the left will move the valve disk holder 17 toward open position instead of toward closed position as previously described. The operation otherwise will be the same as described above. The stop screw 83 limits expansion of the chamber 46 by engaging the plate 54 if the valve disk 20 does not previously engage the seat 18. When the screw 83 is inserted in place of the pin 61 as described, it serves to limit movement of the rod 50 to the right.

A pipe 85 supplies air under pressure (usually fifteen pounds, but obviously any other pressure could be used) to the thermostat 13 and also to a positive positioner 86 incorporated in the valve motor. In the present case the pneumatic thermostat 13 is of the "direct acting" modulating type which means that as the temperature rises the pressure applied to the branch line 14 is increased, branch line pressure being varied between zero and the pressure available in the supply line 85 as the temperature varies within the operating differential of the thermostat. Branch line pressure will vary in approximately direct proportion to the variation in temperature.

The purpose of the positive positioner 86 is to assure that the motor assumes a predetermined position for each value of branch line pressure and functions to vary the pressure in the chamber 46 until that position is reached, thus overcoming frictional and other forces tending to cause incorrect positioning. The positive positioner 86 is generally of the type described in detail in the application of Stanley W. Nickells, Serial No. 261,672, filed March 13, 1939, now Patent No. 2,280,345, and only a brief description will be given of it here. Pressure from the branch line 14 is supplied to the diaphragm chamber 88. This pressure will vary between approximately three and thirteen pounds as the temperature at the thermostat 13 varies through its operating "differential." Pressure in the chamber 88 exerts a force tending to rotate the lever 89 in a clockwise direction to open a supply valve 91, thus admitting air through the pipe 92 to expand the chamber 46.

The rod 50 is provided at its left hand end with a transverse member 95 to which a calibrated tension spring 96 is connected by means of a screw 97 and a nut 98. Lock nuts 99 and 99' serve to maintain the screw 97 and the nut 98 in any preselected relationship. The righthand end of the spring 96 is connected to a lever 100 which is pivoted at 101 with respect to the upper frame member 38. The lever 100 is provided with an abutment 103 which is adjustable lengthwise of the lever 100. A lever 104 secured to the lever 89 of the positive positioner 86 lies generally parallel to the lever 100 when the lever 89 is in its neutral position. It will be seen therefore that the force due to the tension of the spring 96 is transmitted through the lever 100, abutment 103 and the lever 104 to the lever 89 and acts in opposition to the force due to the pressure in the diaphragm chamber 88. It will be seen therefore that as the pressure in the chamber 88 increases, the lever 89 will be rotated in a clockwise direction to open the supply valve 91 and admit air to the chamber 46. The pressure in the chamber 46 will build up until the rod 50 is moved to the left sufficiently to place an additional tension on the spring 96 sufficient to counterbalance the increase in pressure in the diaphragm chamber 88 thereby reclosing the supply valve 91. Likewise as the pressure is reduced in the chamber 88, the lever 89 will be rotated in a counter-clockwise direction to open an exhaust valve 106 and reduce the pressure in the expansible chamber 46 until the rod 50 has moved to the right and has reduced the tension on the spring 96 until the force on the lever 89 due to spring tension exactly equals the force thereon due to the pressure in the chamber 88, thus reclosing the exhaust valve 106.

With the abutment 103 connecting the levers 100 and 104 in the position shown, the spring 96 will have a relatively large mechanical advantage on the chamber 88 transmitted through the lever 89 and it will be necessary for the expansible chamber 46 to change volume through its entire working range in order to produce a sufficient change in the tension of the spring 96 so that the force exerted by the lever 104 on the lever 89 in a counter-clockwise direction will equal the force on the lever 89 in a clockwise direction caused by change in pressure in the chamber 88 to close both the inlet valve 91 and the exhaust valve 106. Likewise as the abutment 103 is adjusted downwardly, movement of the rod 50 from one extreme to the other will produce a smaller change in the force tending to move the lever 89 in a counter-clockwise direction. Therefore the valve may be moved between completely open and completely closed positions on a smaller change in pressure in the branch line 14 when the abutment 103 is moved to the lower positions. Also by adjusting the nut 98 with respect to the screw 97, the branch line pressure at which the valve will start to move may be adjusted. In this way the valve may be made to move from open to closed position between any two desired branch line pressures.

A screw 108 may be adjusted in the plate 54 so that its head 109 will engage the transverse member 95 at any desired valve opening. The screw 108 passes through an opening in the member 95 but the screw threaded portion does not touch the member 95. Likewise the lock nuts 110 may be adjusted to limit the opposite end of the range of valve movement. Another lock nut (not shown) secures the screw 108 to the plate 54 in any desired position. These adjustments are desirable when the valve is used on certain specialized applications. They are also used when the motor unit is applied to a valve requiring a shorter stroke.

The valve is shown in closed position and the linkage 60—65 is almost straightened out in this valve position, while the expansible chamber 46 is at its maximum volume. It will be apparent that predetermined movements of the rod 50 toward valve open position will result in very much smaller movements of the roller 63 and the valve stem 25. As the valve is opened further, a point will be reached where the linkage will cause movement of the valve that is equal to the corresponding movement of the rod 50, while toward maximum open positions the valve disk movements will be greater than corresponding movements of the rod 50. Equal increments of branch line pressure will cause equal increments of the movement of rod 50 since the positive positioner 86 is "actuated" by the combination of branch line pressure and position of the rod 50. Therefore, the relation between branch line pressure and valve position will have a non-linear relationship.

The diagram of Figure 4 shows the relationship between branch line pressure and flow through the valve, assuming the constant pressure of the fluid being valved. The solid line 112 shows the flow characteristics of the valve of the present invention while the dotted line 113 shows the flow characteristics of a conventional valve. It will be seen that relatively large changes in branch line pressure are necessary to cause a predetermined change in flow at the low values of flow, and it is in this range that the valve will be called upon to perform most of its control function. It will be seen that very good modulating characteristics are obtained even when there is a very small flow requirement. This result is obtained by the combination of the non-linear movement of the valve disk in response to control pressures and the characterized valve skirt.

It is to be understood that the valve described in this specification represents only one example of the various features of novelty present in this invention, various changes being obvious to those who are skilled in the art, and I am to be limited therefore, only by the scope of the appended claims.

I claim as my invention:

1. In a fluid pressure actuated device, in combination, an expansible chamber having a wall movable through a predetermined range when fluid is admitted thereto or exhausted therefrom, a member positionable in a straight line by said movable wall, an actuating stem movable in a straight line at right angles to the movement of said member, a first link having one end pivoted to said member and the other end operatively connected to said stem, and a second link pivoted to a fixed support on an axis at right angles to the direction of movement of said member and closely adjacent to said member, said second link being pivoted to said first link intermediate its pivot to said member and its connection to said stem for guiding said first link so that said other end thereof operatively connected to said stem is constrained to movement along substantially said second mentioned straight line.

2. In a fluid pressure actuated device, in combination, a frame, an expansible chamber mounted on said frame and having a wall movable through a predetermined range when fluid is admitted thereto or exhausted therefrom, a member guided along a straight line and having a pivot positionable at different points along said straight line by said movable wall, an actuating stem movable in a straight line at right angles to the guided movement of said member, a first link having one end pivoted to said pivot of said member and the other end operatively connected to the upper end of said stem, and a second link pivoted to said frame on an axis at right angles to the direction of movement of said member and closely adjacent to said member, said second link being pivoted to said first link intermediate its pivot to said member and its connection to said valve stem for guiding said first link whereby its end operatively connected to said stem moves along substantially said second straight line.

3. In a fluid pressure actuated device of the character disclosed, in combination, a frame, an expansible chamber mounted on said frame and having a wall movable through a predetermined range when fluid is admitted thereto or exhausted therefrom, a member positionable in a straight line by said movable wall, a stem movable in a straight line at right angles to the movement of said member, a first link having one end pivoted to said member and the other end operatively connected to the upper end of said stem, a second link pivoted to said frame on an axis at right angles to the direction of movement of said member and closely adjacent to said member, said second link being pivoted to said first link intermediate its pivot to said member and its connection to said stem for guiding said first link at said other end thereof so that said other end moves along substantially said second straight line, and means associated with said stem for varying the effective length thereof to determine the angular relation of said first link with respect to the direction of movement of said member when said stem is at one limit position.

4. In a fluid pressure actuated device, in combination, a frame, an expansible chamber mounted on said frame and having a wall movable through a predetermined range when fluid is admitted thereto or exhausted therefrom, a member positionable in a straight line on said frame by said movable wall, a stem movable in a straight line at right angles to the movement of said member and having its upper end formed as substantially a pair of plane surfaces at right angles to the axis of said stem, a first link having one end pivoted to said member and the other end having a roller engaging between said pair of plane surfaces of said stem, and a second link pivoted to said frame on an axis at right angles to the direction of movement of said member and closely adjacent to said member, said second link being pivoted to said first link intermediate its pivot to said member and said roller for guiding said first link whereby said roller travels along substantially said second straight line.

5. In a fluid pressure actuated device, in combination, a frame, an expansible chamber mounted on said frame and having a wall movable through a predetermined range when fluid is admitted thereto or exhausted therefrom, means for controlling the admission to and exhaustion of fluid therefrom in accordance with a controlling force in such a manner that a predetermined uniform relation is maintained between the position of said wall and the value of said controlling force, a member positionable in a straight line by said wall, an actuating stem movable in a straight line at right angles to the movement of said member and having its upper end formed as a substantially plane surface at right angles to the axis of said stem, a first link having one end pivoted to said member and the other end having a roller engaging the upper end of said stem, and a second link pivoted to said frame on an axis at right angles to the direction of movement of said member and closely adjacent to said member, said second link being pivoted to said first link intermediate its pivot to said member and said roller for guiding said first link so that said roller travels substantially along said second straight line.

6. In a fluid pressure actuated device, in combination, an expansible chamber having a wall movable through a predetermined range when fluid is admitted thereto or exhausted therefrom, means for controlling the admission to and exhaustion of fluid therefrom in accordance with a controlling force in such a manner that a predetermined uniform relation is maintained between the position of said wall and the value of said controlling force, an actuated element movable linearly in a straight line and having a pair of spaced parallel surfaces normal to said line of linear movement, and linkage mechanism between said movable wall and said actuated element having a roller between said parallel surfaces for moving said element along said straight line and through decreasing distances for uniform increments of movement of said wall as said actuated element approaches one of its limits of movement.

7. In a mechanism of the character disclosed, a frame, an actuating member movable in a straight line on said frame, a stem movable in a straight line at right angles to the movement of said member and having its upper end formed as a substantially plane surface at right angles to the axis of said stem, a first link having one end pivoted to said member and the other end having a roller engaging the upper end of said stem, a second link pivoted to said frame on an axis at right angles to the direction of movement of said member and closely adjacent to said member, said second link being pivoted to said first link intermediate its pivot to said member and said roller for guiding said first link with the roller moving in a path substantially along said second straight line.

BERTRAM P. POND.